United States Patent
Hays

(10) Patent No.: US 6,235,100 B1
(45) Date of Patent: May 22, 2001

(54) METALLIZED AZO YELLOW PIGMENTS

(75) Inventor: Byron G. Hays, Chagrin Falls, OH (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/339,138

(22) Filed: Jun. 24, 1999

(51) Int. Cl.$^7$ .................................................... C09D 11/02
(52) U.S. Cl. ...................... 106/31.78; 106/493; 106/496; 534/581; 534/602; 534/757; 534/784; 534/793
(58) Field of Search ................................ 106/31.78, 493, 106/496; 534/581, 602, 757, 784, 793

(56) References Cited

U.S. PATENT DOCUMENTS

| | | | |
|---|---|---|---|
| Re. 35,654 | * 11/1997 | Platman et al. | 106/496 |
| 2,229,049 | 1/1941 | Dahlen et al. | 260/201 |
| 4,594,411 | 6/1986 | Henning | 534/784 |
| 4,618,673 | * 10/1986 | Dore | 534/602 |
| 4,980,458 | 12/1990 | Hari et al. | 534/575 |
| 5,047,517 | 9/1991 | Deucker | 534/784 |
| 5,246,494 | * 9/1993 | Platman et al. | 106/496 |
| 5,669,967 | 9/1997 | Hays | 106/496 |
| 5,733,365 | 3/1998 | Halko et al. | 106/437 |
| 5,744,590 | * 4/1998 | Chorlton et al. | 106/496 |
| 5,746,821 | 5/1998 | Hays | 106/496 |
| 5,919,915 | * 7/1999 | Chorlton et al. | 534/784 |
| 5,997,628 | * 12/1999 | Bindra | 106/496 |

FOREIGN PATENT DOCUMENTS

| | | | |
|---|---|---|---|
| 4111348A1 | 10/1992 | (DE) . | |
| 0361431 | 9/1991 | (EP) . | |
| 0841367A2 | 5/1998 | (EP) | C08K/5/42 |

* cited by examiner

Primary Examiner—Helene Klemanski
(74) Attorney, Agent, or Firm—Raymond F. Keller

(57) ABSTRACT

In one embodiment, the present invention relates to a method of preparing a medium shade yellow pigment composition comprising making an azo pigment by coupling (i) two or more diazonium components made from two or more aromatic amines including 2-amino-5-chloro-4-ethylbenzene-1-sulfonic acid and 2-amino-4-chloro-5-methylbenzene-1-sulfonic acid with (ii) at least 1-(3'-sulfophenyl)-3-methyl-5-pyrazolone, and metallizing the azo pigment with a divalent metal to provide the medium shade yellow pigment composition. The medium shade yellow pigment composition is suitable for use in plastics, paints and inks.

25 Claims, No Drawings

METALLIZED AZO YELLOW PIGMENTS

TECHNICAL FIELD

This invention generally relates to novel metallized azo yellow pigments made with two different aromatic amines and to the use of such pigments in plastics, paints and inks.

BACKGROUND OF THE INVENTION

Azo yellow pigments are a class of colorants that are tinctorially strong and relatively inexpensive. Monoazo yellow pigments show good lightfastness and are particularly useful as coloring agents for paints and some printing inks. In plastics, however, monoazo yellow pigments tend to undesirably bloom and discolor at high temperatures, so their use is disfavored. Disazo (diarylide) yellow pigments are much stronger tinctorially and show a much lower tendency to bloom and discolor at high temperatures. However, R. Az et al reports in *Dyes and Pigments*, 15, 1 (1991), that diarylide yellows are degraded to potentially carcinogenic by-products (e.g., 3,3'-dichlorobenzidine) in plastics processed above 200° C., a temperature lower than that used in processing most plastics (many plastics are processed at temperatures from 250° C. to 330° C.). In attempts to overcome these disadvantages, azo pigment manufacturers have actively pursued development of new metallized azo yellows, analogous to the metallized azo red pigments that show good high temperature stability in plastics.

Two recent patents involve coupling diazotized 2-amino-5-chloro-4-methyl (or ethyl) benzene-1-sulfonic acid into 1-substituted phenyl-3-methyl-5-pyrazolones and metallizing with calcium or strontium. Specifically, U.S. Pat. No. 5,669,967 to Hays involves coupling into 1-(2-chlorophenyl)-3-methyl-5-pyrazolone, while U.S. Pat. No. 5,746,821 also to Hays involves coupling into 1-(4-methylphenyl)-3-methyl-5-pyrazolone.

In the past two decades, there has been notable development activity in metallized azo yellow pigments involving coupling various diazotized 2-aminobenzene-1-sulfonic acid derivatives into coupler 1-(3'-sulfophenyl)-3-methyl-5-pyrazolone (hereinafter 3-sulfo-PMP) and metallizing. For instance, German Offenlegungsschrift specification No. 2616981 (1977, BASF) relates to coupling the calcium salt of diazotized 2-amino-4,5-dichlorobenzene-1-sulfonic acid into 3-sulfo-PMP (Colour Index (C. I.) Pigment Yellow 183). U.S. Pat. No. 4,980,458 to Hari et al discloses the mixed sodium, ammonium or half-calcium salts of diazotized 2-amino-4,5-dichlorobenzene-1-sulfonic acid coupled into 3-sulfo-PMP. U.S. Pat. No. 4,594,411 to Henning discloses the calcium salts of diazotized 2-amino-5-acetylaminobenzene-1-sulfonic acid, 2-amino-5-methoxybenzene-1-sulfonic acid, 2-amino-5-methylbenzene-1-sulfonic acid or 2-amino-5-chlorobenzene-1-sulfonic acid coupled into 3-sulfo-PMP. U.S. Pat. No. 5,047,517 to Deucker discloses the calcium salt of diazotized 2-amino-4-chloro-5-methylbenzene-1-sulfonic acid coupled into 3-sulfo-PMP (C. I. Pigment Yellow 191). German Offenlegungsschrift 4111348 (1992, Sandoz) discloses the strontium salt of diazotized 2-amino-4-chloro-5-methylbenzene-1-sulfonic acid coupled into 3-sulfo-PMP. European Patent 0841 367A2 (1998, Clariant Finance Ltd.) relates to the use of this pigment in plastic packaging material.

U.S. Pat. No. 5,733,365 to Halko et al discloses treatment of titanium dioxide with di-$C_{2-20}$ alkyl sulfo-succinates, but describes Examples with only the well-known dioctyl sulfosuccinate.

Although a few of the metallized azo yellows made from 3-sulfo-PMP (e.g., C. I. Pigment Yellow 191) have been commercialized and show good fastness to heat and light in plastics, they suffer from low tinctorial strength (W. Herbst and K. Hunger, *Industrial Organic Pigments*, VCH, New York, 1993, pp. 236–237). For example, the pigment concentration required for coloring high density polyethylene containing 1% titanium dioxide to ⅓ Standard Depth of Shade is 0.32% for P.Y. 191 vs. only 0.08% for diarylide yellow P.Y. 83 (ibid, p. 255). Plastics processors using diarylide yellows are particularly conscious of the increased costs of using the higher concentrations of metallized azo yellows required for coloring plastics to the required shades. Thus, there is a need for metallized azo yellow pigments that show higher strength, as well as good heat stability and good lightfastness.

SUMMARY OF THE INVENTION

In one embodiment, the present invention relates to a medium shade yellow pigment composition comprising at least one compound having one of the following formulae:

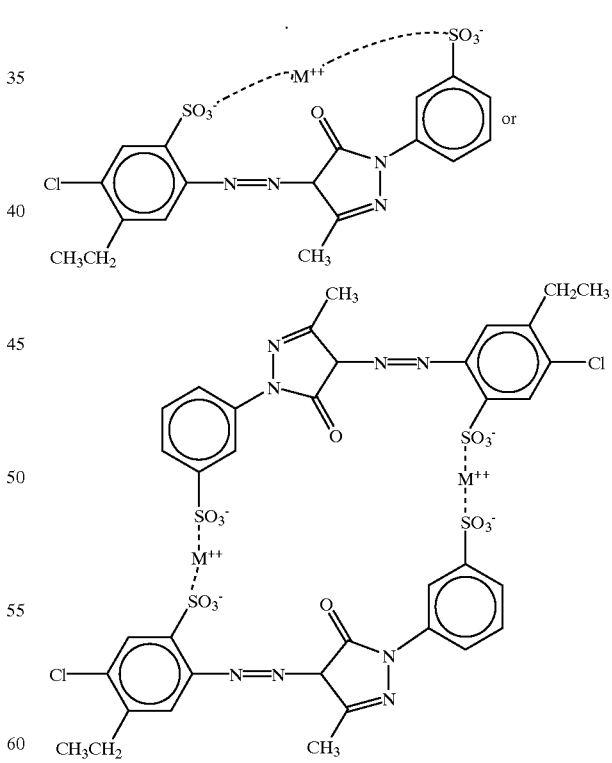

Formulae IV

Formula V

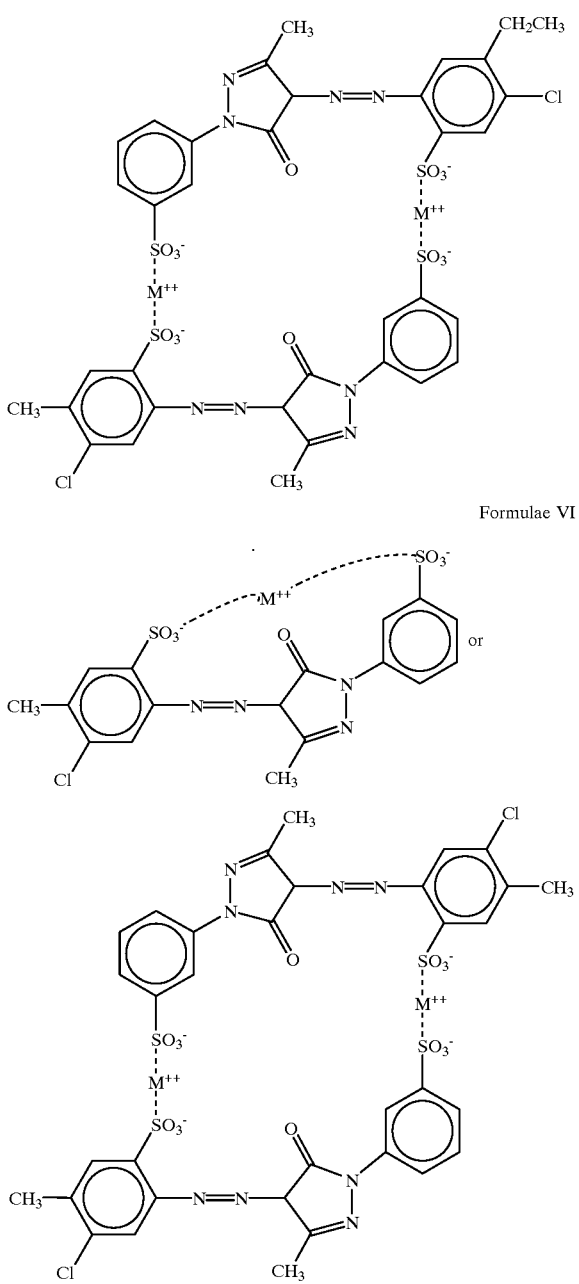

Formulae VI wherein M is a divalent metal.

In another embodiment, the present invention relates to a method of preparing a medium shade yellow pigment composition comprising making an azo pigment by coupling (i) two or more diazonium components made from two or more aromatic amines including 2-amino-5-chloro-4-ethylbenzene-1 -sulfonic acid and 2-amino-4-chloro-5-methylbenzene-1-sulfonic acid with (ii) at least 1-(3'-sulfophenyl)-3-methyl-5-pyrazolone, and metallizing the azo pigment with a divalent metal to provide the medium shade yellow pigment composition.

In yet another embodiment, the present invention relates to a method of preparing a medium shade yellow pigment composition comprising making an azo pigment by coupling (i) two or more diazonium components made from two or more aromatic amines including from about 70% to about 92.5 mole % of 2-amino-5-chloro-4-ethylbenzene-1-sulfonic acid and from about 7.5% to about 30 mole % of 2-amino-4-chloro-5-methylbenzene-1-sulfonic acid with (ii) at least 1-(3'-sulfophenyl)-3-methyl-5-pyrazolone, and metallizing the azo pigment with an alkaline earth metal to provide the medium shade yellow pigment composition.

In still yet other embodiments, the present invention relates to plastics, paints or inks containing metallized azo yellow pigments according to the invention.

The pigments according to the present invention are very surprising because the use of specified amounts of at least two specifically defined aromatic amines is believed to impart high tinctorial and chromatic strength, good heat stability and good lightfastness.

DETAILED DESCRIPTION OF THE INVENTION

The present invention relates to metallized azo medium shade yellow pigments suitable for use as a coloring agent, methods of making and using the metallized azo yellow pigments, and plastics, paints and inks containing the metallized azo yellow pigments. Metallized azo yellow pigments according to the present invention, made with at least two specifically defined aromatic amines, exhibit unexpectedly high tinctorial strengths, even higher than that of C.I. Pigment Yellow 191, while simultaneously exhibiting good heat stability. In addition, the metallized azo yellow pigments according to the present invention exhibit a combination of unexpectedly good heat stability and good lightfastness, in comparison to different metallized azo pigments. In many embodiments, the metallized azo yellow pigments according to the present invention contain few (no more than 2) halogen atoms per pigment molecule, so the metallized azo yellow pigments are environmentally friendly.

In one embodiment, the metallized azo yellow pigments according to the present invention are made by coupling a mixed diazo comprising 2-amino-5-chloro-4-ethylbenzene-1-sulfonic acid (hereinafter Ethyl C Amine as shown in Formula I) along with and in an amount greater than 2-amino-4-chloro-5-methylbenzene-1-sulfonic acid (hereinafter 2B Acid as shown in Formula II):

Formula I

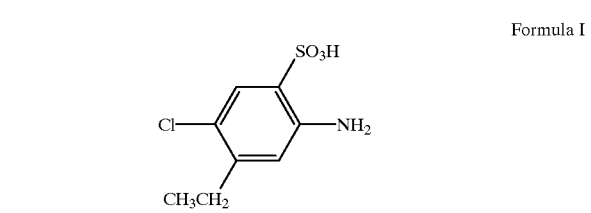

Formula II

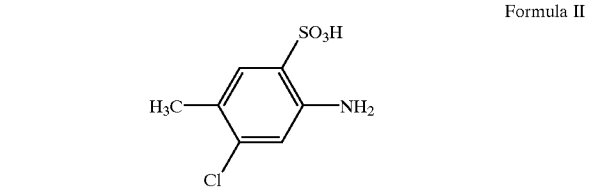

into 1-(3'-sulfophenyl)-3-methyl-5-pyrazolone (3-sulfo-PMP) and metallizing with a divalent metal such as strontium. In another embodiment, the metallized azo yellow pigments made by coupling a mixed diazo comprising from about 70% to about 92.5 mole % of Ethyl C Amine and from about 7.5% to about 30 mole % of 2B Acid. Unless other noted, all percentages are by mole percent. In yet another embodiment, the metallized azo yellow pigments made by coupling a mixed diazo comprising from about 75% to about 90% of Ethyl C Amine and from about 10% to about 25% of 2B Acid. In still yet another embodiment, the metallized azo yellow pigments made by coupling a mixed diazo comprising from about 80% to about 90% of Ethyl C Amine and from about 10% to about 20% of 2B Acid.

For highest tinctorial strength, the combination of Ethyl C Amine and 2B Acid is unique. That is, it is believed that 2B Acid ($R_1=CH_3$, $R_2=Cl$, in the molecular structure below) alone imparts significant increases in strength to the use of Ethyl C Amine. Other commonly available 2-aminobenzene-1-sulfonic acid derivatives (such as when $R_1=Cl$, $R_2=CH_3$; $R_1=CH_3$, $R_2=H$; $R_1=CH_3O$, $R_2=H$; and $R_1=Cl$, $R_2=Cl$) do not give nearly as much increase in strength to Ethyl C Amine. In one embodiment, the mixed diazo further contains one or more of the four 2-aminobenzene-1-sulfonic acid derivatives listed above and embodied by Formula III.

Formula III

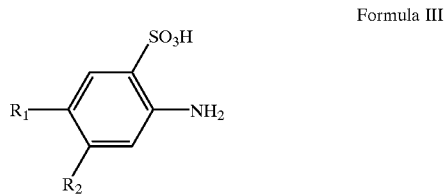

Examples of commonly available aromatic amines characterized by Formula III include 2-aminobenzene-1-sulfonic acid; 2-amino-5-methylbenzene-1-sulfonic acid; 2-amino-5-methoxybenzene-1-sulfonic acid; 2-amino-5-chloro-4-methylbenzene-1-sulfonic acid; 2-amino-4,5-dichlorobenzene-1-sulfonic acid; 2-amino-4-methyl-5-chlorobenzene-1-sulfonic acid; 2-amino-4-chloro-5-methoxybenzene-1-sulfonic acid; etc. In one embodiment, the mixed diazo comprises from about 0.1% to about 10% of a commonly available aromatic amine (according to Formula II). In another embodiment, the mixed diazo comprises from about 0.5% to about 5% of a commonly available aromatic amine (according to Formula III).

In one embodiment, the metallized azo yellow pigments according to the present invention contains a mixture of metallized azo yellow pigments resulting from the above coupling and is believed to be represented by the Formulae IV, V, and VI:

Formulae IV

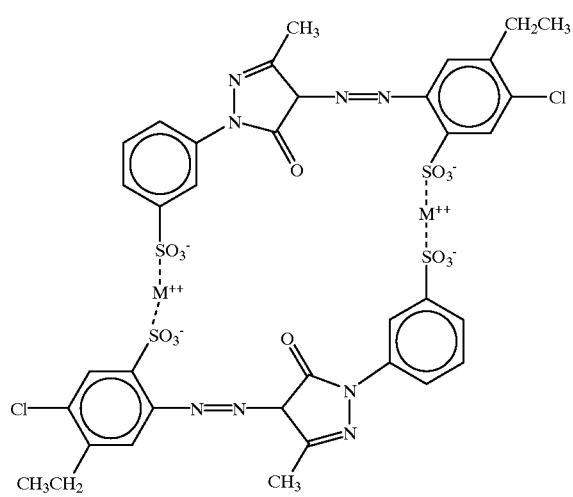

-continued

Formula V

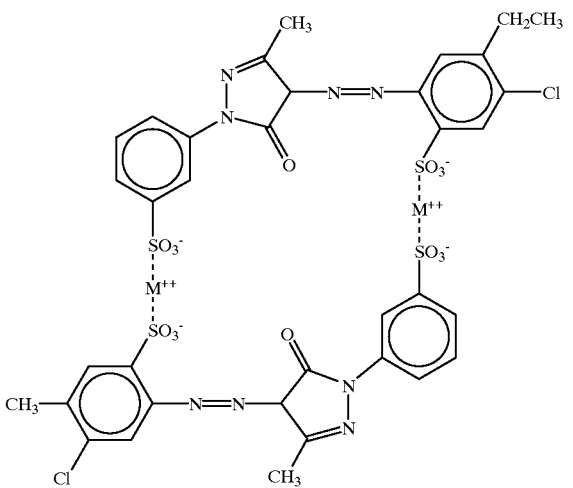

Formulae VI

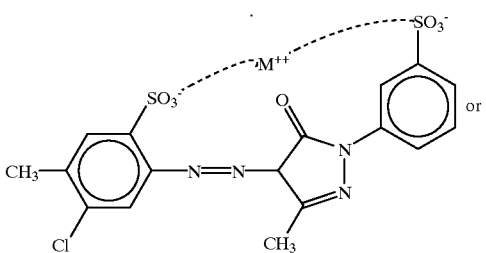

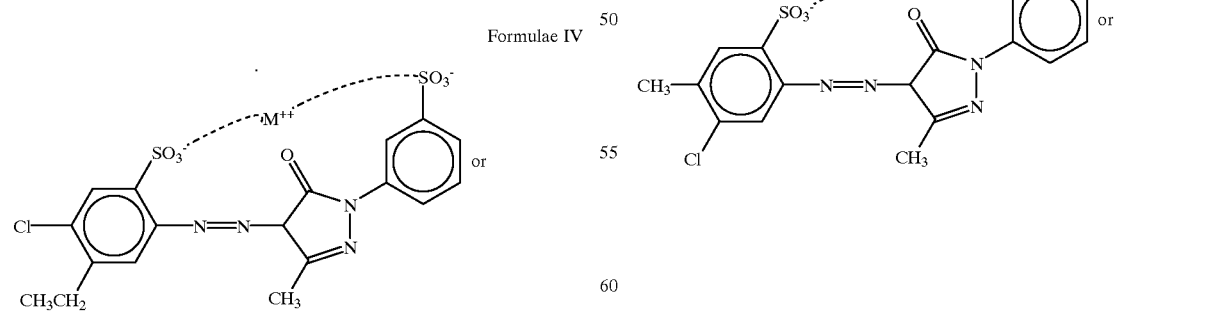

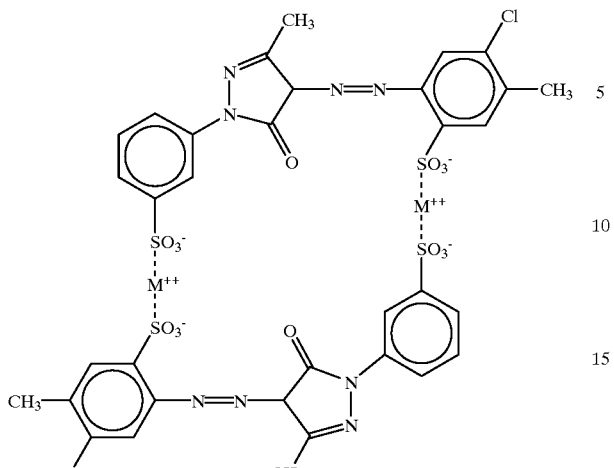

wherein M is a divalent metal, in which the compound of Formulae IV is present in a major amount, the compound of Formula V is present in a minor amount and the compound of Formulae VI is present in a minor amount and typically only a few percent. For purposes of this invention, a major amount means at least about 50% while a minor amount means less than about 50%. In another embodiment, the mixture of metallized azo yellow pigments contains from about 55% to about 90% of the compound of Formulae IV, from about 10% to about 40% of the compound of Formula V, and from about 0.1% to about 15% of the compound of Formulae VI. In yet another embodiment, the mixture of metallized azo yellow pigments contains from about 60% to about 85% of the compound of Formulae IV, from about 15% to about 35% of the compound of Formula V, and from about 0.5% to about 10% of the compound of Formulae VI. In still yet another embodiment, the mixture of metallized azo yellow pigments contains from about 65% to about 80% of the compound of Formulae IV, from about 20% to about 30% of the compound of Formula V, and from about 1% to about 5% of the compound of Formulae VI.

In another embodiment, the metallized azo yellow pigments according to the present invention contains at least one compound of those represented by the Formulae IV, V, and VI. In yet another embodiment, the metallized azo yellow pigments according to the present invention contains at least two compounds of those represented by the Formulae IV, V, and VI.

In a preferred embodiment, the metallized azo yellow pigments according to the present invention contains at least one compound of those represented by the following Formulae IV, V, and VI, wherein the divalent metal is strontium.

Formulae IV

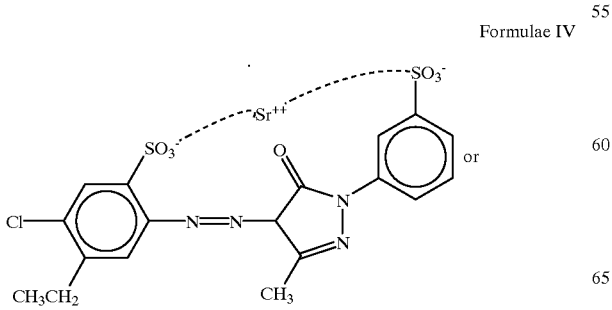

or

Formulae V

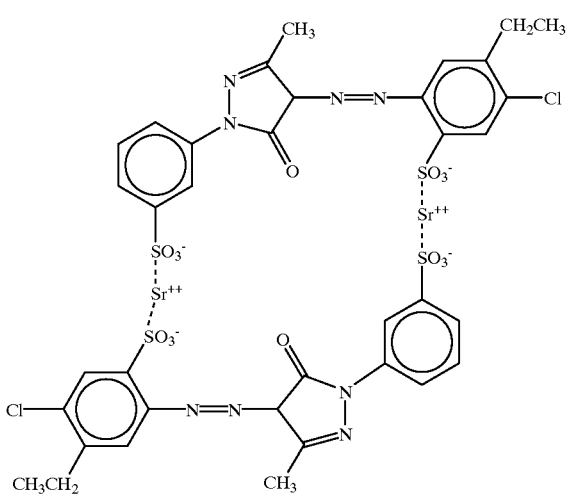

Formula V

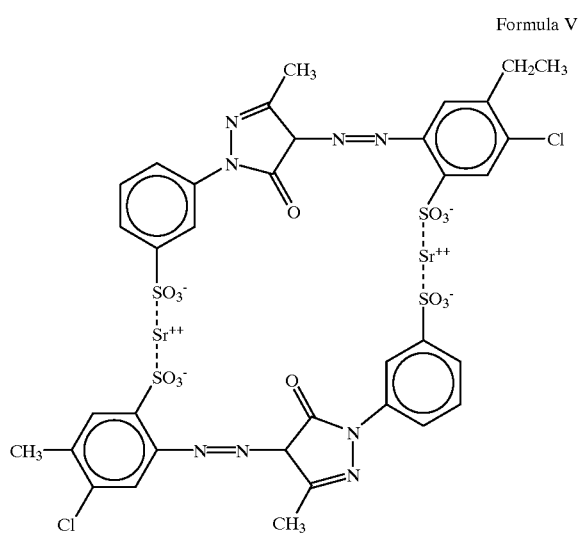

Formulae VI

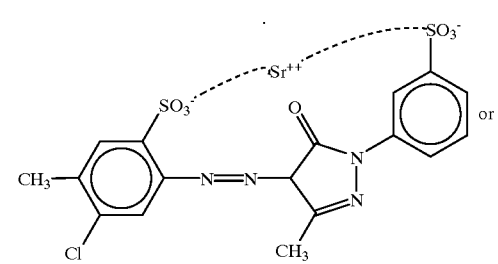

or

-continued

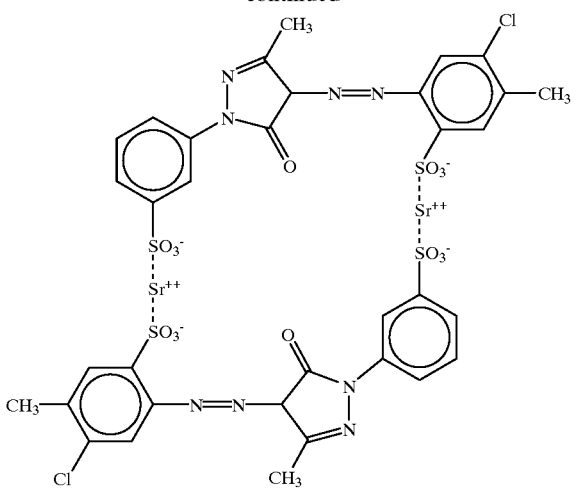

The pigments of the present invention may be prepared by initially diazotizing the aromatic amines wherein at least two of the aromatic amines are Ethyl C Amine and 2B Acid to form at least two diazonium components, coupling the diazonium components with a coupling component comprised of a 3-sulfo-PMP coupler, and metallizing with a divalent metal to form the desired pigment.

The aromatic amines from which the diazonium components are prepared are available commercially or can be prepared using methods known in the art. The diazotization of the aromatic amines useful for the purposes of this invention may be carried out in the manners known to those skilled in the art. For example, diazotization may be carried out through the use of alkali metal nitrites or lower alkyl nitrites together with an adequately strong acid such as a mineral acid. Examples of useful mineral acids include hydrochloric acid and sulfuric acid. Nitrosyl sulfuric acid also can be utilized. The diazotization reaction can be conducted at a temperature in the range from about −20° C. to about 30° C., preferably from about 0° C. to about 20° C.

In one embodiment, it is advantageous in the diazotization reaction mixtures (and/or in the subsequent coupling reaction and/or metallization mixtures) to include one or more surface active agent such as a non-ionic, an anionic or a cationic surface active agent before, during the reaction or after the reaction is complete. In another embodiment, it is advantageous in the diazotization reactions (and/or in the subsequent coupling reactions and/or metallization reactions) not to include a surface active agent. In some instances the use of a surfactant gives significantly higher increases in tinctorial strength.

In a preferred embodiment, one or more anionic surface active agents is included in the coupling reaction mixture before, during or after the reaction. In another embodiment, one or more cationic surface-active agents is included in the diazotization reaction mixture before or during the reaction.

In one embodiment, the coupling reaction mixture contains from about 2% to about 20% by weight of a surface active agent (for example, about 8% or about 9% by weight), and preferably from about 5% to about 15% by weight of an anionic surface active agent. In another embodiment, the diazotization reaction mixture contains from about 7% to about 12% by weight of a surface active agent, and preferably from about 7% to about 12% by weight of an cationic surface active agent.

In embodiments where one or more surface active agents are employed, anionic and/or cationic surfactants are preferred. Examples of surface active agents include amine oxide surfactants, and specifically cationic amine oxide surfactants, sulfosuccinate surfactants and derivatives thereof and specifically anionic sulfosuccinate surfactants and derivatives thereof.

Sulfosuccinate surfactants include disodium ethoxylated-alcohol half ester of sulfosuccinic acid, disodium ethoxylated nonylphenol half ester of sulfosuccinic acid, dicyclohexyl ester of sodium sulfosuccinic acid, disodium isodecyl sulfosuccinate, diamyl ester of sodium sulfosuccinic acid, dihexyl ester of sodium sulfosuccinic acid, sodium salt of sulfated nonylphenoxy polyethoxy ethanol, dioctyl ester of sodium sulfosuccinic acid, bis(tridecyl) ester of sodium sulfosuccinic acid, and disodium alkyl sulfosuccinate. Examples include those under the trade designation Aerosol available from Cytec Industries and specifically product designations A-102, A-103, A-196, A-268, AY, MA-801, NPES, OT, TR-70 and 501; those under the trade designation Geropon available from Rhone-Poulenc and specifically product designations SDS, SS-O and 99; and those under the trade designation Mackanate available from The McIntyre Group and specifically product designations DOS-70M5 and DOS-75.

In another embodiment, the sulfosuccinate surfactant is a sodium dialkylsulfosuccinate surfactant having the molecular formula:

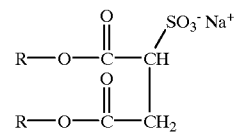

in which R is an alkyl group having from about 3 to about 20 carbon atoms and preferably from about 5 to about 15 carbon atoms.

In one embodiment, it is advantageous in the diazotization reactions (and/or in the subsequent coupling and/or metallization reactions) to include one or more appropriate organic solvents. For example, suitable organic solvents include one or more of glacial acetic acid, lower alkanols, dioxane, formamide, dimethyl formamide, dimethyl sulfoxide, pyridine or N-methyl pyrrolidone. In another embodiment, it is advantageous in the diazotization reactions (and/or in the subsequent coupling and metallization reactions) not to include one or more organic solvents.

The coupling reaction useful for the purposes of the present invention may be effected preferably by adding the diazonium components to the coupling components, but the coupling components can be alternatively added to the diazonium components. Coupling is generally effected at a temperature of from about −20° C. to about 80° C., preferably from about 0° C. to about 40° C. As in the diazotization reaction, coupling may be carried out in the presence or absence of an suitable surface active agent and/or organic solvent, such as all of those identified above for the diazotization reaction.

In another embodiment, generally, the diazonium components are coupled with a slight stoichiometric excess of the coupling component. That is, one equivalent of the diazonium components (total amount of the diazonium components) is coupled with slightly more than one equivalent of the coupling component. In one embodiment, the ratio of equivalents of the diazonium components to the coupling component is from about 0.9:1 to about 1.1:1. In another embodiment, the ratio of equivalents of the diazonium components to the coupling component is from about 0.95:1 to about 1:1 and preferably from about 0.98:1 to about 1:1.

In another embodiment of the present invention, the dispersibility of the pigments of the present invention can be improved by adding alkali-soluble resin-like products before, during, or after the coupling is completed. Various resin-like materials can be added for this purpose, and these include for example, rosin resins, polymeric rosins, resin soap, chemically modified rosin resins, such as rosin-maleinate resins, alkyd resins, and other synthetic hydrocarbon resins with a higher acid number, or combination of these resins. The resins may be present in a product with free carboxyl groups that are capable of forming a salt, or may be partially or completely in the form of salts, for example, with alkali metal ions. It may also be advantageous to perform the coupling reaction in the presence of a finely divided insoluble material, for example, alkaline earth metal sulfates and carbonates, titanium dioxide or clay materials or very finely divided organic plastic materials.

Metallization is performed using a divalent metal salt which forms the sulfonate salt. This is also known as laking and forms the metallized azo yellow pigment. The divalent metal salt may be a salt of at least one of alkaline earth metals, manganese, nickel or zinc specifically including mixtures of two or more of these metals. Alkaline earth metals include magnesium, calcium, strontium and barium. Alkaline earth metal salts are preferred. Examples of divalent metal salts include $CaCl_2$, $CaBr_2$, $CaF_2$, $Ca(NO_3)_2$, $MgCl_2$, $MgBr_2$, $MgF_2$, $Mg(NO_3)_2$, $MgSO_4$, $SrCl_2$, $SrBr_2$, $SrF_2$, $Sr(NO_3)_2$, $BaCl_2$, $BaBr_2$, $BaF_2$, $Ba(NO_3)_2$, $MnCl_2$, $MnBr_2$, $MnF_2$, $Mn(NO_3)_2$, $MnSO_4$, $NiCl_2$, $NiBr_2$, $Ni(NO_3)_2$, $NiSO_4$, $ZnCl_2$, $ZnBr_2$, $ZnF_2$, $Zn(NO_3)_2$, and $ZnSO_4$. Preferred alkaline earth metal salts include $SrCl_2$, $Sr(NO_3)_2$, and $CaCl_2$. In a preferred embodiment, the divalent metal salt is a strontium salt. Metallization may be accomplished by adding the metal salt to the dye after coupling of all the diazonium components present is complete or, preferably by including about one equivalent of the divalent metal salt in the diazonium components whereby metallization occurs as the dye is formed (during coupling).

In one general example, the metallized azo yellow pigment is made by coupling a mixed diazo comprising 85% Ethyl C Amine and 15% 2-amino-4-chloro-5-methylbenzene-1-sulfonic acid 2B Acid into 3-sulfo-PMP in the presence of 9% sodium bistridecyl sulfosuccinate and metallizing with strontium. In another general example, the metallized azo yellow pigment is made by coupling a mixed diazo comprising 90% Ethyl C Amine and 10% 2B Acid into 3-sulfo-PMP in the presence of 10% sodium bistridecyl sulfosuccinate and metallizing with strontium.

In most applications, it is desirable, in order to achieve the full brightness and tinctorial strength, to heat the metallized azo yellow pigment. For example, the metallized azo yellow pigment may be heated to reflux temperature for about 1 to 3 hours or at temperatures above about 100° C. under pressure in the presence or absence of the above-described resin soaps or other soluble resins.

After completion of the reactions and optional heating, the metallized azo yellow pigments are recovered from the water-based reaction slurry by filtering to form a presscake of pigment which is washed with hot water (e.g., from about 40° C. to about 60° C.) so as to remove the excess acids, bases and unwanted salts formed during the coupling reaction. The presscake is typically washed with from about 10 to about 20 times its volume of hot water. The filter cake is generally washed until the filtrate gives only a slightly positive test for chloride ion. The washed presscakes can be dried, ground and used in the form of a coarse or finely divided powder. Alternatively, the metallized azo yellow pigments of this invention can be dispersed into oleoresinous vehicles to prepare flushed bases or dispersed into aqueous vehicles to prepare aqueous dispersions.

The pigment compositions of this invention provide high quality medium-shade yellow pigments having improved color strength, light fastness and/or heat stability and are useful as coloring agents in plastics, paints and inks. This invention, therefore, also relates to plastic, paint and ink compositions comprising major amounts of a plastic, paint vehicle or ink vehicle and minor amounts of the metallized azo yellow pigment compositions of this invention.

The paint, ink and plastic compositions in which the compositions of this invention are useful are well known to those of ordinary skill in the art. Examples of inks include printing inks and lacquers, and examples of plastics include thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polycarbonates, polyurethanes, polyesters, for example polyglycol terephthalates, and polyacrylonitrile. It is also useful for pigment printing and for the pigmenting of paper in the mass.

Due to its excellent heat resistance, the metallized azo yellow pigment is particularly suitable for the pigmenting of plastics in the mass, such as, for example, of polystyrene and its mixed polymers, polyolefins, in particular polyethylene and polypropylene and the corresponding mixed polymers and copolymers, polyvinyl chloride and polyesters in particular polyethylene terephthalate and polybutylene terephthalate and the corresponding mixed condensation products based on polyesters, and mixtures and copolymers thereof.

See, for example, with regard to ink: R. H. Leach, editor, *The Printing Ink Manual,* Fourth Edition, Van Nostrand Reinhold (International) Co. Ltd., London (1988), particularly pages 282–591; with regard to paints: C. H. Hare, *Protective Coatings,* Technology Publishing Co., Pittsburgh (1994), particularly pages 63–288; and with regard to plastics: T. G. Webber, *Coloring of Plastics,* John Wiley & Sons, New York (1979), particularly pages 79–204. The foregoing references are hereby incorporated by reference herein for their teachings of ink, paint and plastic compositions, formulations and vehicles in which the compositions of this invention may be used including amounts of colorants.

The following examples illustrate the pigments of the present invention. Unless otherwise indicated in the following examples, in the specification and in the appended claims, all parts are by weight, all percentages are by mole percent, temperatures are in degrees centigrade and pressures are at or near atmospheric pressure.

EXAMPLE 1

A diazo slurry is prepared by dissolving 20.1 parts 2-amino-5-chloro-4-ethylbenzene-1-sulfonic acid (Ethyl C Amine) and 3.3 parts (15 mole %) 2-amino-4-chloro-5-methylbenzene-1-sulfonic acid (2B Acid) in 420 parts hot water containing 4.1 parts sodium hydroxide, reprecipitating the amines with 26.0 parts 20° Baume hydrochloric acid, adding 1.2 part 75% by weight sulfated castor oil and then enough ice to make a 0° C. slurry, adding 7.0 parts sodium nitrite dissolved in 21 parts water, stirring the slurry at 0–5° C. for 60 minutes, adding sufficient sulfamic acid to eliminate excess nitrous acid, adding 10.6 parts strontium nitrate dissolved in 25 parts water and then adjusting the volume to 1360 parts.

A coupler solution is prepared by dissolving 25.9 parts 1-(3'-sulfophenyl)-3-methyl-5-pyrazolone (3-Sulfo-PMP) in 400 parts water containing 6.0 parts sodium hydroxide and 5.6 parts sodium acetate, diluting the solution to 1000 parts, adding a solution of 7.4 parts Cytec Industries Inc.'s Aerosol™ TR-70 (70% by weight sodium bistridecylsulfosuccinate) dissolved in 300 parts water, then adjusting the temperature to 34–35° C. and the pH to 6.4–6.5.

The diazo slurry is coupled into the coupler slurry over a period of 20 minutes, while the pH is maintained at 6.0–6.5 by addition of 10% sodium hydroxide and the temperature is maintained at 30–35° C.; at the end of coupling, the slurry shows no excess diazo. After the slurry is stirred for an hour, 31.8 parts of strontium nitrate dissolved in 74 parts water are added, followed by adjusting the pH to 5.7–5.8, heating to 100° C., boiling for 30 minutes, icing to lower than 60° C. and filtering; the filtercake is washed, dried overnight at 82° C. and pulverized in an Osterizer to give 58.0 parts yellow powder.

EXAMPLE 2

The procedure of Example 1 is repeated, except that the pH is maintained at 5.0–5.5 during coupling and the coupling is accomplished over 15 minutes, giving 57.6 parts yellow powder.

EXAMPLE 3

The procedure of Example 1 is repeated, except that the coupling is accomplished over 25 minutes and the pH is maintained at 5.0–5.5, giving 58.4 parts yellow powder.

EXAMPLE 4

The procedure of Example 1 is repeated, except that the temperature is maintained at 25–30°, the coupling is accomplished over 25 minutes and the pH is maintained at 5.0–5.5, giving 58.4 parts yellow powder.

EXAMPLE 5

The procedure of Example 1 is repeated, except that the coupler solution contains only 3.7 parts Aerosol™ TR-70, giving 56.4 parts yellow powder.

EXAMPLE 6

The procedure of Example 1 is repeated, except that the coupler solution contains only 3.7 parts Aerosol™ TR-70 and the temperature is maintained at 40–45°, giving 56.0 parts yellow powder.

EXAMPLE 7

The procedure of Example 1 is repeated, except that the diazo is made with 18.9 parts Ethyl C Amine and 4.4 parts (20 mole %) 2B Acid, the coupling is accomplished over 15 minutes and the pH is maintained at 5.0–5.5 during coupling, giving 58.8 parts yellow powder.

EXAMPLE 8

The procedure of Example 1 is repeated, except that the diazo is made with 21.6 parts Ethyl C Amine and 2.2 parts (10 mole %) 2B Acid, giving 60.0 parts yellow powder.

COMPARATIVE EXAMPLE 1

The procedure of Example 1 is repeated, except that the diazo is made only with 23.6 parts Ethyl C Amine (no 2B Acid), giving 62.4 parts yellow powder.

COMPARATIVE EXAMPLE 2

The procedure of Example 1 is repeated, except that the diazo is made with 22.8 parts Ethyl C Amine and 1.1 parts (5 mole %) 2B Acid, giving 60.8 parts yellow powder.

COMPARATIVE EXAMPLE 3

The procedure of Example 1 is repeated, except that the diazo is made with 3.3 parts (15 mole %) 2-amino-5-chloro-4-methylbenzene-1-sulfonic acid (C Amine) in place of the 2B Acid, giving 52.4 parts yellow powder.

COMPARATIVE EXAMPLE 4

The procedure of Example 1 is repeated, except that the diazo is made with 2.8 parts (15 mole %) 2-amino-5-methylbenzene-1-sulfonic acid (4B Acid) in place of the 2B Acid, giving 56.2 parts yellow powder.

COMPARATIVE EXAMPLE 5

The procedure of Example 1 is repeated, except that the diazo is made with 19.2 parts Ethyl C Amine and 3.8 parts (20 mole %) 4B Acid, giving 52.0 parts yellow powder.

COMPARATIVE EXAMPLE 6

The procedure of Example 1 is repeated, except that the diazo is made with 3.0 parts (15 mole %) 2-amino-5-methoxybenzene-1-sulfonic acid in place of the 2B Acid, giving 58.0 parts yellow powder.

COMPARATIVE EXAMPLE 7

The procedure of Example 1 is repeated, except that the diazo is made with 3.6 parts (15 mole %) 2-amino-4,5-dichlorobenzene-1 -sulfonic acid in place of the 2B Acid, giving 62.0 parts yellow powder.

COMPARATIVE EXAMPLE 8

The procedure of Example 1 is repeated, except that the coupler solution contains 7.4 parts Cytec Industries Inc.'s Aerosol™ OT-70 (70% by weight sodium dioctylsulfosuccinate) in place of the Aerosol™ TR-70, giving 56.8 parts yellow powder.

COMPARATAIVE EXAMPLE 9

The procedure of Example 6 is repeated, except that the coupler solution contains 3.7 parts Aerosol™ OT-70 (70% by weight sodium dioctylsulfosuccinate) in place of the Aerosol™ TR-70, giving 56.8 parts yellow powder.

COMPARATIVE EXAMPLE 10

The procedure of Example 6 is repeated, except that the coupler solution contains 2.6 parts Witco Corp.'s Supralate™ ME Dry (sodium dodecylsulfate) in place of the Aerosol™ TR-70, giving 55.4 parts yellow powder.

COMPARATIVE EXAMPLE 11

The procedure of Example 6 is repeated, except that the coupler solution contains 5.8 parts Rhone-Poulenc Inc.'s Rhodacal™ DSB (45% by weight disodium dodecyidiphenylether disulfonate) in place of the Aerosol™ TR-70, giving 55.6 parts yellow powder.

COMPARATIVE EXAMPLE 12

The procedure of Example 6 is repeated, except that the coupler solution contains 2.6 parts Rhone-Poulenc Inc.'s Rhodafac™ RS-610 (tridecyloxypolyoxyethylene phosphate) in place of the Aerosol™ TR-70, giving 56.4 parts yellow powder.

COMPARATIVE EXAMPLE 13

The procedure of Example 6 is repeated, except that the coupler solution contains 9.3 parts Rhone-Poulenc Inc.'s Rhodapex™ CO-433 (sodium nonylphenyloxypolyoxyethylene sulfate) in place of the Aerosol™ TR-70, giving 54.8 parts yellow powder.

COMPARATIVE EXAMPLE 14

The procedure of Example 6 is repeated, except that the coupler solution contains 2.6 parts Rhone-Poulenc Inc.'s Rhodafac™ RE-610 (nonylphenyloxypolyoxyethylene phosphate) in place of the Aerosol™ TR-70, giving 56.0 parts yellow powder.

COMPARATIVE EXAMPLE 15

The procedure of Example 6 is repeated, except that the coupler solution contains 2.6 parts Union Carbide Corp.'s Tergitol™ 15-S-12 (undecyl-pentadecyloxypolyethylene glycol) in place of the Aerosol™ TR-70, giving 53.2 parts yellow powder.

COMPARATIVE EXAMPLE 16

The procedure of Example 6 is repeated, except that the coupler solution contains 2.6 parts ICI Inc.'s Tween™ 20 (dodecoylsorbitanoxypolyethylene glycol) in place of the Aerosol™ TR-70, giving 50.8 parts yellow powder.

Testing of Pigments

The standard pigment, to which the experimental pigments are compared, is medium-shade yellow Hoechst 11-3071 PV Fast Yellow HGR (C. I. Pigment Yellow 191).

For comparing tinctorial strength and other coloristic values, the pigments are tested initially as 1:1 (0.1 phr pigment: 0.1 phr titanium dioxide) tints in high density polyethylene injection molded chips, as follows: A mixture of 0.500 part pigment, 0.500 part titanium dioxide and 500 parts high density polyethylene (Solvay T50-2000-G) is shaken on a paint shaker for 15 seconds, then injection molded at 232° C. for 1.5 minutes in a 30 ton Battenfeld machine. Spectrophotometric values of the molded chips are measured with a Macbeth Color-Eye (specular component included, large area) to give apparent strengths versus the standard pigment and CIE L*C*h hue angles under Illuminant D, 10 degrees, as shown in Table I. To obtain a better measure of the tinctorial strengths, some of the stronger pigments are then tested as 0.75:1 tints (25% reduction in pigment content) by repeating this procedure, except that 0.375 part pigment is used in place of the 0.500 part pigment; apparent strengths and hue angles are shown in Table II. To obtain another measure of tinctorial strengths, the strongest pigments in Table II are then tested as 0.70:1 (30% reduction in pigment content) by repeating this procedure, except that 0.350 part pigment is used in place of the 0.500 part pigment; apparent strengths and hue angles are shown in Table III.

For comparing heat stability, the pigments are tested as above for coloristic values of 1:1 tints, except that the chips are molded and held at 288° C. for 3 minutes. Spectrophotometric values of the molded chips are measured with a Macbeth Color-Eye (specular component included, large area) versus the chips molded at 232° C. to give CIELab delta E values, as shown in Table IV.

For comparing fade resistance, the high density polyethylene injection molded 1:1 tint chips used for coloristic values are exposed for 100 hours in an Atlas Xenon Fade-Ometer. Spectrophotometric values of the exposed chips are measured with a Macbeth Color-Eye (specular component included, large area) versus unexposed chips to give CIELab delta E values, as shown in Table V.

For comparing apparent strength, other coloristic values and fade resistance in a paint vehicle, the standard pigment and the pigment of Example 1 are tested as 1:1 tints as follows: A mixture of 0.50 part pigment, 0.50 parts titanium dioxide (DuPont Ti-Pure R-960), 23.2 parts air-dry alkyd enamel vehicle (containing 86% by weight medium oil alkyd, 13% by weight mineral spirits and 1% by weight driers/antiskinning agent) and 75 parts media (Zircoa Zir-beads Y1304) is stirred with a spatula to a uniform mixture, sealed with a lid and shaken on a paint shaker for 30 minutes. The dispersion is separated from the media, drawn down with a 0.15 mm gap coating bar on coated cardboard (Leneta Form 2-C) and allowed to dry for 1–2 days. Since it is much stronger than the standard, the pigment of Example 1 was tested also as a 0.7:1 tint (0.35 part pigment and 0.50 part titanium dioxide). Spectrophotometric values are measured with a Macbeth Color-Eye (specular component included, large area) to give the apparent strengths and hue angles under Illuminant D, 10 degrees, shown in Table VI. The drawdowns are exposed in a xenon arc Fade-O-Meter for 100 hours, then measured in the Color-Eye to give the CIELab delta E values shown in Table VII.

TABLE I

Coloristic Values of 1:1 Tints in HDPE

| Pigment | Apparent Strength | Hue Angle (h) |
|---|---|---|
| C.I.P.Y. 191 | Standard (K/S = 20.899) | 78.4° |
| Example 1 | +17% (K/S = 24.426) | 78.0° |
| Example 2 | +22% | 78.1° |
| Example 3 | +16% | 77.9° |
| Example 4 | +16% | 77.9° |
| Example 5 | +16% | 77.4° |
| Example 6 | +13% | 77.5° |
| Example 7 | +19% | 78.2° |
| Example 8 | +15% | 78.1° |
| Comp. Ex. 1 | −15% | |
| Comp. Ex. 2 | +5% | |
| Comp. Ex. 3 | +4% | |
| Comp. Ex. 4 | −21% | |
| Comp. Ex. 5 | −7% | |
| Comp. Ex. 6 | −20% | |
| Comp. Ex. 7 | +2% | |
| Comp. Ex. 8 | +4% | |
| Comp. Ex. 9 | +3% | |
| Comp. Ex. 10 | +7% | |
| Comp. Ex. 11 | −3% | |
| Comp. Ex. 12 | −16% | |
| Comp. Ex. 13 | −20% | |
| Comp. Ex. 14 | −15% | |
| Comp. Ex. 15 | −22% | |
| Comp. Ex. 16 | −22% | |
| C.I.P.Y. 183 | −3% | 75.4° |

In Table I, the apparent strengths of the Examples, made with 10–20 mole % 2B Acid and coupled in the presence of 5–10% by weight Aerosol TR-70, are estimated to be 13–22% stronger than C.I. P.Y. 191 in 1:1 tints. The hue angles of the Example tints are generally slightly lower (redder) than the C.I. P.Y. 191 tint. The apparent strengths of the Comparative Examples (C.E.), made with no or only 5% 2B Acid (C.E. 1 and 2), with 15–20% of alternatives to 2B Acid (C.E. 3–7) or with alternatives to Aerosol TR-70 (C.E.

8–16), are much weaker than the Examples. Also, for comparison, C.I. P.Y. 183 (BASF Paliotol Yellow K2270), made with 2-amino-4,5-dichlorobenzene-1-sulfonic acid, is 3% weaker and somewhat redder than the C.I. P.Y. 191 tint.

TABLE II

Coloristic Values of 0.75:1 Tints in HDPE

| Pigment | Apparent Strength | Chroma (C*) | Hue Angle (h) |
| --- | --- | --- | --- |
| C.I.P.Y. 191 (1:1) | Standard (K/S = 20.851) | 77.8 | 78.4° |
| Example 1 (0.75:1) | +4% | 79.1 | 79.3° |
| Example 2 (0.75:1) | +4% | 79.1 | 79.7° |
| Example 3 (0.75:1) | +2% | 78.6 | 79.5° |
| Example 4 (0.75:1) | −2% | 76.8 | 79.7° |
| Example 5 (0.75:1) | +1% | 78.4 | 78.9° |
| Example 6 (0.75:1) | −1% | 77.9 | 78.9° |
| Example 7 (0.75:1) | +5% | 79.2 | 79.7° |
| Example 8 (0.75:1) | +1% | 78.7 | 79.3° |

In Table II, the apparent strengths of the Examples, made with 10–20 mole % 2B Acid and coupled in the presence of 5–10% by weight Aerosol TR-70, are estimated to be −2–+5% in 0.75:1 tints; this means that the Examples are 23–30% stronger than C.I. P.Y. 191. The Chroma values, another measure of color strength, are, except for Example 4, slightly higher for the Examples than for C.I. P.Y. 191. The hue angles of the Example tints are slightly higher (greener) than that of the C.I. P.Y. 191 tint.

TABLE III

Coloristic Values of 0.70:1 Tints in HDPE

| Pigment | Apparent Strength | Chroma (C*) | Hue Angle (h) |
| --- | --- | --- | --- |
| C.I.P.Y. 191 (1:1) | Standard (K/S = 20.851) | 77.8 | 78.4° |
| Example 1 (0.70:1) | +2% | 78.7 | 79.6° |
| Example 2 (0.70:1) | −1% | 78.3 | 80.1° |
| Example 7 (0.70:1) | +1% | 78.6 | 80.1° |

In Table III, the apparent strengths of Examples 1, 2 and 7, made with 15–20 mole % 2B Acid and coupled in the presence of 10% by weight Aerosol TR-70, are estimated to be −1–+2% in 0.70:1 tints; this means that these three Examples are 29–32% stronger than C.I. P.Y. 191. The Chroma values, another measure of color strength, are slightly higher for the Examples than for C.I. P.Y. 191. The hue angles of the Example tints are slightly higher (greener) than that of the C.I. P.Y. 191 tint.

TABLE IV

Changes in Coloristic Values at 1:1 Tints in HDPE After Heat Stability Testing

| Pigment | Delta E |
| --- | --- |
| C.I.P.Y. 191 | 0.8 |
| Example 1 | 0.7 |
| Example 2 | 0.8 |
| Example 3 | 0.9 |
| Example 4 | 0.9 |
| Example 5 | 0.9 |
| Example 6 | 0.9 |
| Example 7 | 1.4 |
| Example 8 | 1.0 |

In Table IV, the delta Es (a measure of change) for the heat stabilities of the Examples are about the same as for C.I. P.Y. 191. The delta Es for the heat stabilities of the Examples and C.I. P.Y 191 are generally much lower than the delta E=2.0, that is considered to be the upper limit for concern by plastics processors.

TABLE V

Changes in Coloristic Values of 1:1 Tints in HDPE After Fade Testing

| Pigment | Delta E |
| --- | --- |
| C.I.P.Y. 191 | 0.35 |
| Example 1 | 1.3 |
| Example 2 | 1.4 |
| Example 3 | 1.3 |
| Example 4 | 1.4 |
| Example 5 | 1.1 |
| Example 6 | 1.3 |
| Example 7 | 1.5 |
| Example 8 | 1.3 |

In Table V, the delta Es (a measure of change) for the fade resistance of the Examples are somewhat higher than for C.I. P.Y. 191 and probably result from the smaller particle sizes predicted for these significantly stronger pigments. However, the delta Es for the fade resistances of the Examples are low enough in these 1:1 tints to allay concerns of most plastics processors.

TABLE VI

Coloristic Values of 1:1 Tints in Air-Dry Enamel

| Pigment | Apparent Strength | Hue Angle (h) |
| --- | --- | --- |
| C.I.P.Y 191 | Standard (K/S = 23.705) | 76.8° |
| Example 1 | +13% | 76.9° |
| Example 1 (70%) | +0.2% | 78.2° |

In Table VI, the apparent strength of Example 1, made with 15 mole % 2B Acid and coupled in the presence of 10% by weight Aerosol TR-70, is estimated to be about equal to the standard in a 0.70:1 tint; this means that this Example is 30% stronger than C.I. P.Y. 191 in 1:1 tints in air-dry enamel. The hue angles of the Example tints are equal to slightly higher (greener) than that of the C.I. P.Y. 191 tint.

TABLE VII

Changes in Coloristic Values of 1:1 Tints in Air-Dry Enamel After Fade Testing

| Pigment | Delta E |
| --- | --- |
| C.I.P.Y. 191 | 0.36 |
| Example 1 | 0.64 |
| Example 1 (70%) | 0.54 |

In Table VII, the delta Es (a measure of change) for the fade resistance of the Example 1 are somewhat higher than for C.I. P.Y. 191 and probably result from the smaller particle sizes predicted for these significantly stronger pigments. However, the delta Es for the fade resistances of Example 1 are low enough in these 1:1 tint drawdowns to allay concerns of most paint manufacturers.

When incorporated in polyolefins, the pigments obtained according to the present invention display strong, bright medium shade yellows in contrast to the generally weaker shades displayed by conventional pigments. The relatively high chromaticity values are consistent with the brightness of the color displayed while the high strength is reflected by a relatively high K/S values.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A medium shade yellow pigment composition comprising at least one compound having one of the following formulae:

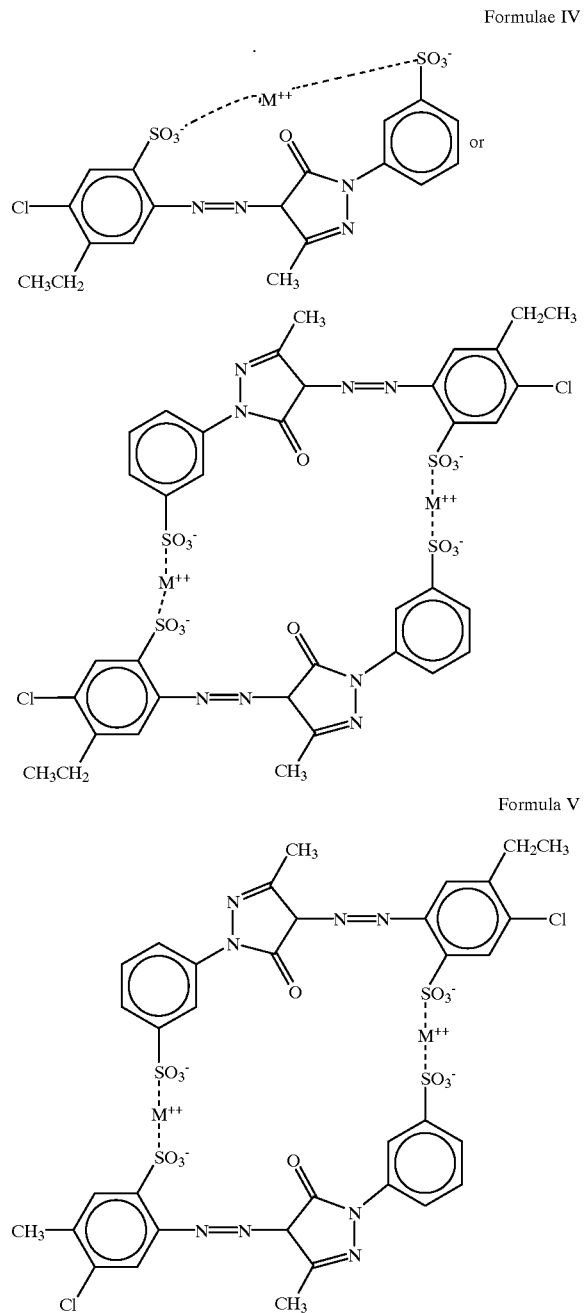

wherein M is a divalent metal.

2. A composition according to claim 1, wherein the medium shade yellow pigment composition comprises compounds of Formulae IV and Formula V.

3. A composition according to claim 1, wherein the medium shade yellow pigment composition comprises a major amount of compounds of Formulae IV and a minor amount of compounds of Formula V.

4. A composition according to claim 1, wherein the mixture of metallized azo yellow pigments contains from about 55% to about 90 mole % of the compound of Formulae IV and from about 10% to about 40 mole % of the compound of Formula V.

5. A composition according to claim 1, wherein M is at least one of an alkaline earth metal, manganese, nickel and zinc.

6. A composition according to claim 1, wherein M is strontium.

7. A composition according to claim 1 further comprising an anionic sulfosuccinate surfactant.

8. A method of preparing a medium shade yellow pigment composition comprising:

making an azo pigment by coupling (i) two or more diazonium components made from two or more aromatic amines comprising 2-amino-5-chloro4-ethylbenzene-1-sulfonic acid and 2-amino-4-chloro-5-methylbenzene-1-sulfonic acid with (ii) at least 1-(3'-sulfophenyl)-3-methyl-5-pyrazolone; and metallizing the azo pigment with a divalent metal to provide the medium shade yellow pigment composition.

9. A method according to claim 8, wherein the two or more diazonium components are made from two or more aromatic amines comprising from about 75% to about 90 mole % of 2-amino-5-chloro4-ethylbenzene-1 -sulfonic acid and from about 10% to about 25 mole % of 2-amino4-chloro-5-methylbenzene-1-sulfonic acid.

10. A method according to claim 8, wherein the divalent metal is at least one of manganese, nickel, zinc, magnesium, calcium, strontium and barium.

11. A method according to claim 8, wherein the azo pigment is made in the presence of a sodium dialkylsulfosuccinate surfactant having the molecular formula:

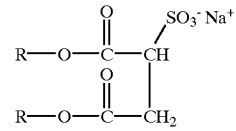

wherein R is an alkyl group having from about 3 to about 20 carbon atoms.

12. A method of preparing a medium shade yellow pigment composition comprising:

making an azo pigment by coupling (i) two or more diazonium components made from two or more aromatic amines comprising from about 70% to about 92.5 mole % of 2-amino-5-chloro4-ethylbenzene-1-sulfonic acid and from about 7.5% to about 30 mole % of 2-amino-4-chloro-5-methylbenzene-1-sulfonic acid with (ii) at least 1-(3'-sulfophenyl)-3-methyl-5-pyrazolone; and metallizing the azo pigment with an alkaline earth metal to provide the medium shade yellow pigment composition.

13. A method according to claim 12, wherein (i) and (ii) are coupled in the presence of at least one surfactant.

14. A method according to claim 12, wherein the alkaline earth metal is strontium.

15. A method according to claim 12, wherein the ratio of equivalents of (i) to (ii) is from about 0.9:1 to about 1.1:1.

16. A method according to claim 12, further comprising heating the medium shade yellow pigment composition.

17. A composition prepared according to the method of claim 8.

18. A composition prepared according to the process of claim 12.

19. A paint composition comprising a paint vehicle and the composition of claim 1.

20. A paint composition comprising a paint vehicle and the composition of claim 17.

21. An ink composition comprising an ink vehicle and the composition of claim 1.

22. An ink composition comprising an ink vehicle and the composition of claim 17.

23. A plastic composition comprising a plastic material and the composition of claim 1.

24. A plastic composition comprising a plastic material and the composition of claim 17.

25. A composition according to claim 1, further comprising at least one compound having the formulae:

Formulae VI

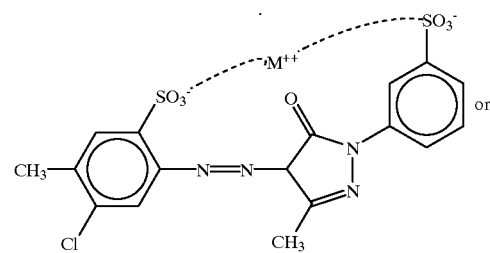

or

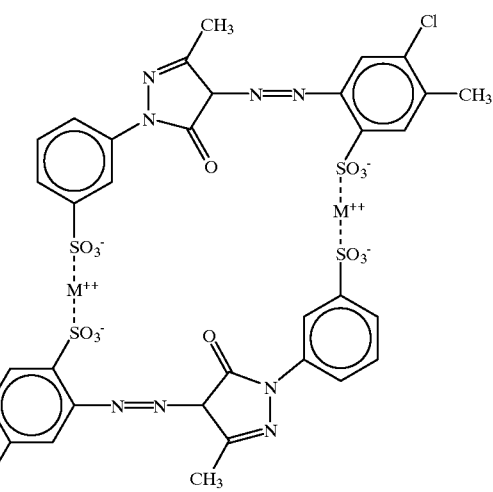

wherein M is a divalent metal.

* * * * *